No. 881,763. PATENTED MAR. 10, 1908.
A. A. ALLEN.
NUT LOCK.
APPLICATION FILED OCT. 24, 1907.
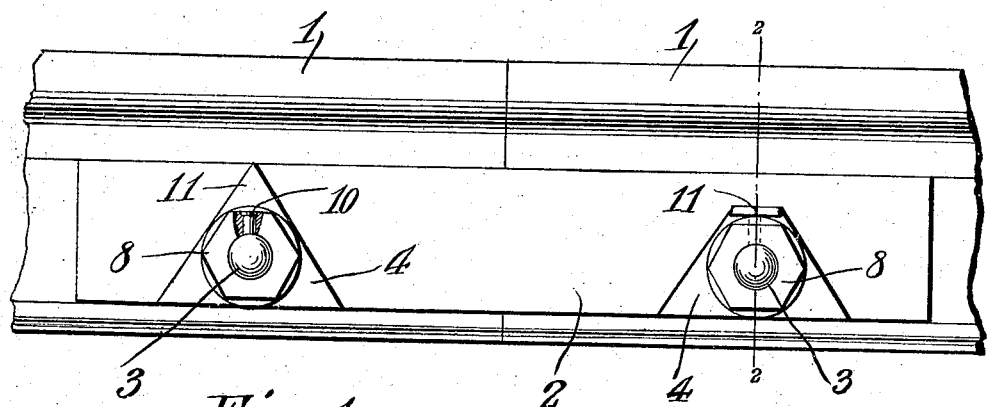
Fig. 1.
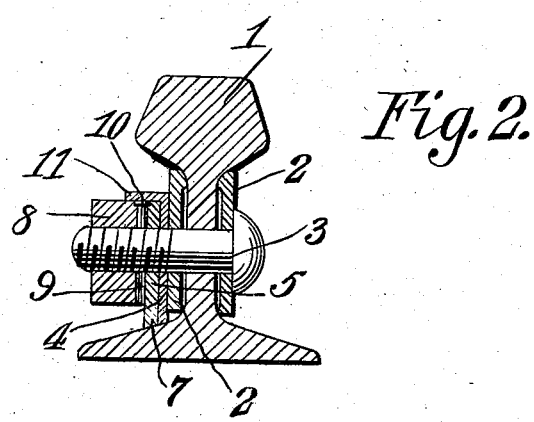
Fig. 2.
Fig. 3.
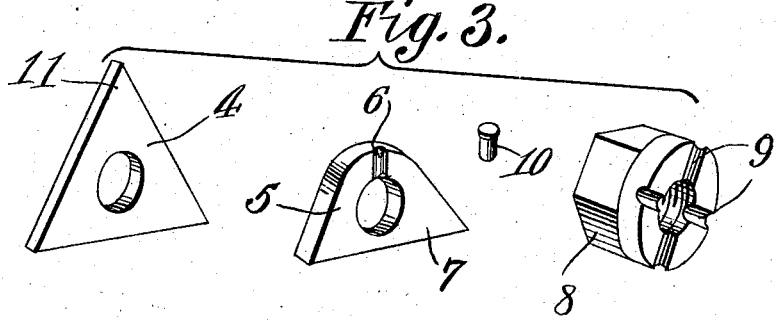
Witnesses
Joe. P. Wahler
Wm. J. Koerth
Inventor
Asher A. Allen.
By Victor J. Evans,
Attorney

UNITED STATES PATENT OFFICE.

ASHER A. ALLEN, OF GLOUSTER, OHIO.

NUT-LOCK.

No. 881,763.  Specification of Letters Patent.  Patented March 10, 1908.

Application filed October 24, 1907. Serial No. 398,989.

*To all whom it may concern:*

Be it known that I, ASHER A. ALLEN, a citizen of the United States, residing at Glouster, in the county of Athens and State of Ohio, have invented new and useful Improvements in Nut-Locks, of which the following is a specification.

This invention relates to nut locks, and the object of the invention is to provide the simple means by which a nut may effectively be retained upon a bolt and which also provides means whereby the nut may be readily and easily disengaged from the bolt.

To these and other ends the invention resides in the novel construction of elements and their arrangement in operative combination as will hereinafter be fully described and claimed.

In the drawings, Figure 1 illustrates my improved nut lock shown in operative position upon the fish plate of a rail. Fig. 2 is a longitudinal sectional view taken upon the line 2—2 of Fig. 1. Fig. 3 is a detail perspective view of the several elements employed in my invention.

In the drawings the numeral 1 designates a railway rail of ordinary construction provided with the fish plates 2.

The numeral 3 designates a bolt adapted as a retaining means for securing the fish plates 2 upon the meeting ends of the rails.

Secured upon the bolt 3 is a washer 4 preferably triangular in shape as clearly illustrated in the drawings having its lower horizontal face adapted to bear against the base flange of the rail. A second washer 5 provided with a radial groove 6 and having its lower face 7 also adapted for engagement upon the base flange of the rail is secured upon the bolt 3 immediately in front of the triangular washer 4.

The screw threaded nut 8 having one of its faces provided with radial grooves 9 is mounted upon the threaded portion of the bolt and the nut tightened until one of the radial grooves upon its base coincides with the radial groove 6 upon the washer 5. A key 10 is adapted to be inserted within the registering grooves 6 and 9 formed by the washer 5 and the nut 8.

When the elements are in position above described the vertex 11 of the washer 4 is bent over the grooves formed by the nut 8 and washer 5, thus securely retaining the key 10 within its seat and preventing turning of the nut.

Should the removal of the nut be desired the vertex 11 of the washer 4 is bent backward into its normal position shown upon the left hand of Fig. 1, and the parts are readily disassembled by the removal of the key 10 from its seat.

From the above description it will be noted that I have provided an extremely simple and efficient means for retaining the nut upon a bolt and have also provided for the ready removal of the nut from the bolt.

Having thus fully described the invention, what is claimed as new is:

A nut lock comprising, in combination with a bolt, a washer fitted upon the bolt, a second washer fitted upon the bolt, a nut mounted upon the threaded portion of the bolt, the adjacent faces of the nut and washer being provided with radial grooves and a key adapted to be inserted within said grooves, and a portion of the first named washer adapted to be bent over the grooves.

In testimony whereof I affix my signature in presence of two witnesses.

ASHER A. ALLEN.

Witnesses:
J. C. HEADLEY,
ELMER C. MORRIS.